Inventor:
Frithiof V. Johnson,
by *Charles W. Mott*
His Attorney.

United States Patent Office 2,942,475
Patented June 28, 1960

2,942,475

ACCELERATION RESPONSIVE DEVICE

Frithiof V. Johnson, Scotia, N.Y., assignor to General Electric Company, a corporation of New York Filed Oct. 4, 1954, Ser. No. 459,909

8 Claims. (Cl. 73—516)

This invention relates to an acceleration responsive device and, more particularly, to such a device in which the acceleration responsive element is rotatably mounted.

Acceleration measuring instruments have been known in the past as accelerometers, and the device disclosed herein may be called an accelerometer in the sense that a signal is produced responsive to an acceleration, and it is only necessary to add measuring equipment in order to have an instrument which satisfies the definition of an accelerometer.

It is an object of this invention to provide an acceleration responsive device having an acceleration responsive element mounted for rotation, which device is highly sensitive and accurate.

Another object is to provide an acceleration responsive device having bearings for rotatably supporting the acceleration responsive element, in which the load on the bearings is reduced to a minimum or eliminated.

Another object is to provide an acceleration responsive device having bearings for rotatably supporting the acceleration responsive element, in which the bearings carry no load for accelerations in the direction being measured, no load for accelerations in the direction perpendicular to a plane through the pivot axis and the direction of measuring, and no thrust load, but only a moment for accelerations in a direction in alignment with the pivot axis.

Briefly stated in accordance with one aspect of this invention, there is provided an acceleration responsive device having the acceleration responsive element pivotally mounted for free rotation in either direction. This acceleration responsive element has a center of gravity which is displaced with respect to the axis about which the element is mounted for rotation, and thus will have a torque imparted to it in response to accelerations in a direction other than one in alignment with the pivot axis. Means are provided for neutrally suspending the acceleration responsive element to promote the sensitivity and accuracy of its response, and to greatly reduce or eliminate the load on the bearings. Sensing means are provided for producing a signal in response to movement of the acceleration responsive element about its axis, and this signal is utilized to impart movement to the acceleration responsive element in the opposite direction from that caused by acceleration, and thus return the element to the null position. Means are also provided for obtaining a signal proportional to the acceleration to which the acceleration responsive element is subjected.

Additional advantages, features and objects of the invention will become apparent upon perusal of the following description with reference to the drawing, and the scope of the invention will be pointed out in the claims.

Figure 1:
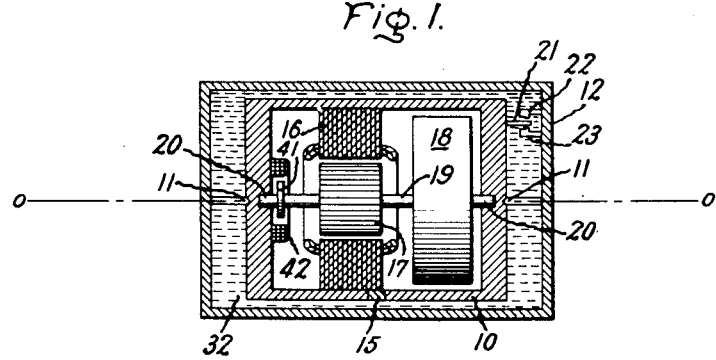
Fig. 1 is a diagrammatic sectional view of a device illustrating one embodiment of this invention.

Referring more specifically to the drawings, an acceleration responsive element is provided and is mounted for rotation about an axis. In the illustrated embodiment, this element is in the form of a container 10 pivotally mounted by bearing means 11 for rotation about an axis O—O. The bearing means 11 are mounted within a housing 12, which is fixed with respect to the member whose acceleration is to be measured.

The container 10 has its center of gravity displaced from its axis of rotation, whereby a torque is transmitted to the container in response to linear acceleration of the housing in a direction other than one in alignment with the axis of rotation. In the illustrated embodiment, the center of gravity is so located by the use of an unbalance mass 15 mounted eccentrically in the container 10.

Means are provided for imparting a counter-torque to the container in response to the torque caused by the linear acceleration. This means in the illustrated embodiment is in the form of an electric motor mounted within the container 10, including a stator 16, a rotor 17, and a flywheel 18, mounted on the rotor shaft 19. The shaft 19 is mounted for rotation by bearing means in the form of journals 20 provided in the container 10.

Pick-off means are provided for producing a signal in response to angular movement of the container relative to housing 12. This pick-off means is in the form of a movable coil 21, which is fixed on the container 10 and moves with the container within the air gap of a closed magnetic circuit made up of magnetizable members 22 and 23 mounted on the inside of housing 12 and energized by a coil 24.

Figure 2:
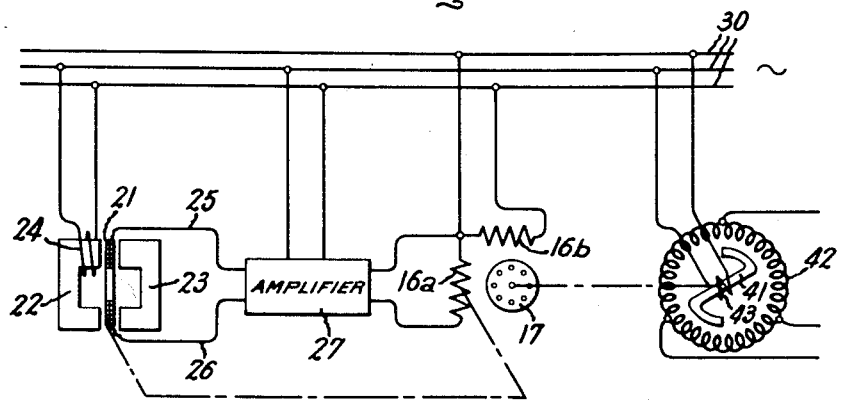
Fig. 2 is a circuit diagram illustrating the operation of the electrical components of the device shown in Fig. 1.

Circuit means are provided for applying the signal produced in the pick-off means to the motor, so as to impart a counter-torque to the container 10. This circuit means includes the leads 25 and 26, connecting the coil 21 through an amplifier 27 to one phase 16a of the stator 16 of the two-phase motor. The other phase 16b of the stator 16 is connected to a suitable A.-C. power source 30, and the power for the amplifier 27 and for energizing the pick-off coil 24 is also obtained from the source 30. Flexible connectors, suitably insulated (not shown in Fig. 1), are used to transmit power and signals between the container 10 and the housing 12 in accordance with the circuit shown in Fig. 2. The pick-off signal is applied to the motor so that the rotation of the rotor and the flywheel will be in the same direction as the torque imparted to the container by the acceleration, whereby the reaction torque on the stator will be in the opposite direction, acting to return the container to the null position.

A liquid 32 surrounds the container 31 and fills the space between the container and the housing 12. The relation between the density of the liquid and the weight and weight distribution of the container, including the apparatus mounted inside the container, is made such that the container is neutrally suspended within the liquid. In a sample device this neutral suspension was obtained with great exactness, a low viscosity liquid, namely heptacosafluorotributylamine being used. The results of this neutral suspension of the container are that so long as the torque applying system operates accurately, the bearing means 11 will carry no load for accelerations in the direction being measured. Also, the bearing means will carry no load for accelerations perpendicular to a plane through the pivot axis O—O and the direction of measuring, and they will carry no thrust load, but will only support a moment for accelerations in the direction of the pivot axis. Furthermore, friction in the rotor journals 20 or windage between the flywheel and its enclosing container will have no effect on the accuracy of the device of this invention. Similarly, the load of tachometers, selsyns, or other measuring and transmitting means will not affect the accuracy so long as they do not affect the balance of the suspended container.

Means are provided for obtaining a signal proportional to the displacement of the rotor. In the illustrated embodiment, this means is in the form of a selsyn mounted within the container 10 and comprising a rotary member 41 mounted on the shaft 19, and a field winding 42. The energizing winding 43 (Fig. 2) for the rotor of the selsyn receives power from the source 30. The output voltage from the field 42 of the selsyn may be used as a control signal in the energization of an autopilot used in the actuation of the control surfaces of the aircraft or missile in which the acceleration responsive device of this invention is used. An example of such an autopilot may be seen in U.S. Patent 2,416,097 to Hansen, Jewell, Johnson, and Porter.

Figure 3:
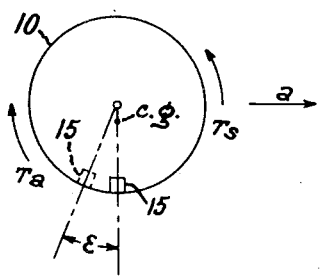
Fig. 3 is a sketch illustrating the forces acting on the acceleration responsive element of the illustrated embodiment of this invention.

In operation, the acceleration responsive device of this invention is preferably mounted on a stabilized table within an aircraft, missile, or other vehicle so that accelerations of the vehicle are imparted to the acceleration responsive device through the housing 12. Thus, if the device is subjected to an acceleration in a direction perpendicular to the Fig. 1 sketch, or in the direction "$a$" as seen in Fig. 3, an acceleration torque $T_a$, is imparted to the container 10. The effect of this first torque is to cause a slight rotation of the container 10, as through an angle E. In response to movement of the container caused by this torque $T_a$, a signal is generated within the pick-off coil 21 which is amplified and applied to the motor to cause a reaction torque $T_s$ in the stator 16, which is a counter-torque acting to restore the container 10 to the null position.

The functions and advantages of the present invention may be better understood from an analysis of the following mathematical discussion.

Let:

$a$=acceleration of the aircraft (therefore of the housing 12).
$v$=velocity of the aircraft in direction of $a$.
$I$=moment of inertia of rotor and flywheel.
$\alpha$=angular acceleration of the rotor.
$Mr$=static moment of the pivoted container 10.

The torques acting on the motor stator 16 are as follows:

$Mra$=torque due to acceleration of the aircraft ($T_a$)
$-I\alpha$=reaction torque due to the acceleration of the rotor ($T_s$)

So long as the pick-off and follow-up system control the rotor acceleration to prevent rotation of the stator (that is, to keep the container 10 in a null position), the sum of these torques must be zero.

$$Mra = I\alpha$$

Integrating both sides of this equation, we obtain:

$$Mrv = I\omega$$

Integrating again (that is, taking the double integral of the acceleration equation), it will be seen that the distance traveled by the aircraft will be proportional to the angular displacement of the rotor. Thus, it is seen that the acceleration of the motor rotor is proportional to the linear acceleration of the aircraft or of the housing 12; the speed of the motor is proportional to the integral of the acceleration, or to the system velocity; and the total motor rotation is proportional to the integral of the velocity or to the distance traveled by the aircraft.

What is claimed as new and desired to be secured by Letters Patent of the United States is:

1. An acceleration responsive device comprising a housing, a sealed substantially cylindrical container having a motor and flywheel mounted therein, said container being mounted for rotation about an axis within the housing, the flywheel axis, the axis of the container and said axis of rotation being coincident, a liquid filling the housing and surrounding the container, an eccentric mass in the container arranged to make its center of buoyancy and its center of gravity non-coincident, the relationship between the container and the liquid being such that the weight of the displaced liquid is equal to the weight of the container and its contents including said eccentric mass, the eccentric mass being responsive to linear acceleration of the device to impart a first torque to the container, means including said motor for imparting a counter-torque to the container in response to movement thereof caused by said first torque, and means for obtaining a signal proportional to the rotation of said flywheel.

2. A device as set forth in claim 1, said counter-torque imparting means including means for producing a voltage signal in response to movement of the container, and a circuit for applying said voltage signal to said motor so as to rotate the flywheel and impart a counter-torque to the container.

3. An acceleration responsive device comprising a housing, a sealed container mounted for rotation about an axis within the housing, said container having its center of gravity displaced from said axis whereby a first torque is imparted to the container in response to linear acceleration of the housing in a direction other than one one in a plane through said axis and said center of gravity, an electric motor in the container including a stator secured to the container and a rotor driving a flywheel, pick-off means for producing a signal in response to movement of the container, circuit means for applying said signal to the motor so as to impart a counter-torque to the container, a liquid surrounding the container and filling the space between the container of the housing, the relation between the density of the liquid and the weight of the container being such that the container is substantially neutrally suspended in said liquid, and means for obtaining a signal proportional to the rotation of said flywheel.

4. A device as set forth in claim 3, the rotor axis and the pivotal axis of the container being coincident.

5. An acceleration responsive device comprising a housing, a sealed substantially cylindrical container having a motor and flywheel mounted therein, said container being mounted for rotation about an axis within the housing, the flywheel axis, the axis of the container and said axis of rotation being coincident, an eccentric mass in the container, said mass being responsive to linear acceleration of the device to impart a torque to the container, means including the motor and flywheel for imparting a counter-torque to the container in response to movement thereof caused by said first torque, and means for obtaining a signal proportional to the displacement of the flywheel.

6. A device as set forth in claim 5, said counter-torque imparting means including means for producing a voltage signal in response to movement of the container, and a circuit for applying said voltage signal to said motor so as to rotate the flywheel and impart a counter-torque to the container.

7. An acceleration responsive device comprising a housing, a container mounted within the housing for rotation about an axis, the center of gravity of the container being displaced from the axis, whereby accelerations applied to said housing having components normal to the plane through the axis and the center of gravity established a torque about said axis tending to rotate the container about the axis, means including a motor having a non-rotatable member and a rotatable member having a moment of inertia, said non-rotatable member being fixedly mounted in said container, said motor being so mounted that changes in the angular velocity of the rotatable member of the motor establish a torque about the axis causing the container to rotate about the axis, means responsive to the rotation of the container about the axis from a predetermined position for causing the motor to be energized to create a torque to maintain the container substantially at said predetermined position, whereby the amount of power supplied to said motor is a function of the magnitude of the component of the applied acceleration normal to said plane, changes in the angular velocity of the rotatable member being a function of the changes in speed of the housing in a direction normal to said plane, and the angular displacement of the rotatable member being a function of the displacement of said housing in a direction normal to said plane.

8. In an acceleration responsive device having a housing and a container mounted within the housing for rotation about an axis, the center of gravity of the container being displaced from the axis, whereby components of accelerations applied to said housing normal to the plane through the axis and the center of gravity establish a torque about said axis tending to rotate the container relative to the housing; the improvements comprising a motor having a rotatable member having a substantial moment of inertia, and a non-rotatable member, said non-rotatable member being fixedly mounted in said container, said motor being mounted in the container so that changes in the angular velocity of the rotatable member of the motor establish a torque about the axis for causingn the container to rotate about the axis, and feedback means including means for detecting relative motion of the container with respect to the housing, and an amplifying device for energizing said motor to create a torque to oppose the torque produced by the components of the applied accelerations normal to said plane to substantially prevent rotation of said container about its axis of rotation.

References Cited in the file of this patent
UNITED STATES PATENTS

| | | |
|---|---|---|
| 1,668,809 | James | May 8, 1928 |
| 1,840,001 | Tsujita | Jan. 5, 1932 |
| 2,498,997 | McLean et al. | Feb. 28, 1950 |
| 2,591,921 | Cosgriff et al. | Apr. 8, 1952 |
| 2,704,326 | Whitson et al. | Mar. 15, 1955 |
| 2,752,791 | Jarosh et al. | July 3, 1956 |
| 2,802,956 | Jarosh et al. | Aug. 13, 1957 |
| 2,853,287 | Draper et al. | Sept. 23, 1958 |